July 10, 1962   W. H. NOONE   3,043,426
BLACK WATER CLARIFICATION
Filed April 5, 1960
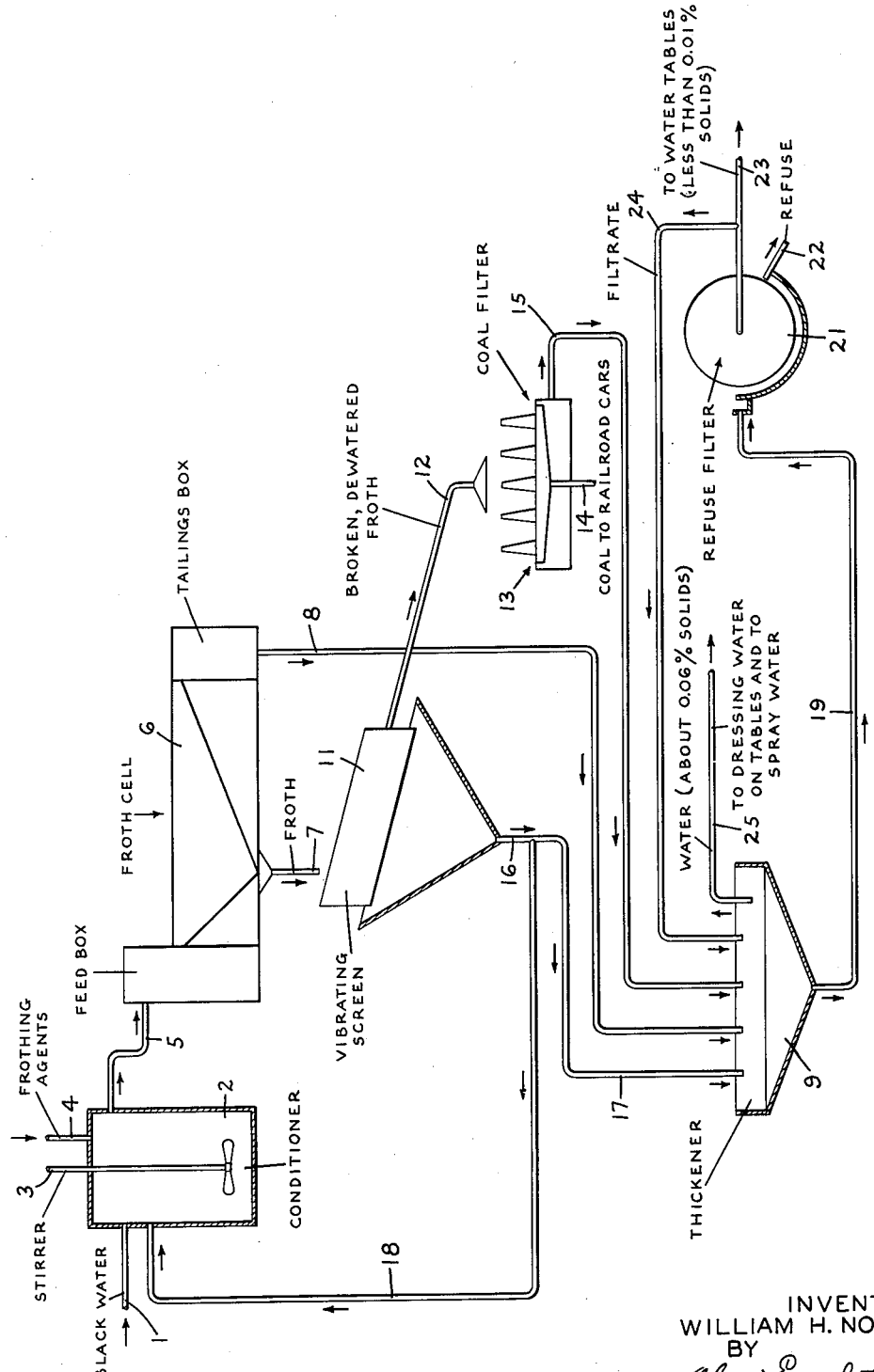
INVENTOR
WILLIAM H. NOONE
BY
Alvin Engelstein
ATTORNEY

3,043,426
BLACK WATER CLARIFICATION

William H. Noone, Charlton Heights, W. Va., assignor to Allied Chemical Corporation, New York, N.Y., a corporation of New York
Filed Apr. 5, 1960, Ser. No. 20,099
3 Claims. (Cl. 209—12)

This invention relates to the treatment of waste water from coal preparation and more particularly refers to a new and improved process for clarifying black water and concomitantly recovering the suspended fine coal in the water.

Coal received from the mine is ground to smaller size and repeatedly washed with water in various apparatus for purpose of removing impurities from the coal. Such coal washery waste water is usually subjected to treatment in centrifuges, cyclones and settling tanks to reduce the solids content of the water. While these procedures effect removal of the larger particles of solids from the waste water, the resultant water remains contaminated with very fine particles of coal and impurities. The majority of particles is minus 325 mesh or 44 microns in size which are so fine as to be practically unfilterable. The amount of solids in this wash water termed by the industry black water ranges from about 1 to 10% and these solids consist mostly of valuable coal which it is desired to recover.

The desirability of reducing the solids content of the product water to value of less than 0.1% is of paramount importance for at least three reasons. (1) Black water presents a waste disposal problem of large proportion—a typical plant produces about sixty thousand gallons black water per hour. In the past, large amounts of the black water was dumped into streams but increasing governmental legislation prohibits disposal in this manner. Further, in many areas water is or has become in short supply and the quantities of water necessary for coal preparation are not readily available. (2) At first it would appear that black water containing relatively small amounts of solids could be reused as washery water in regular plant operation. However, long experience has shown that water having a low solids content below about 0.1% is necessary to get low ash and low moisture products from the regular plant operation. Hence, the clarification of black water to a solids content of less than 0.1% is a requirement to the coal preparation process where it is necessary to get the maximum effectiveness out of the regular plant cleaning and dewatering equipment. In this regard, clarification of the black water must be accomplished in an economical efficient manner as complex expensive procedures are without practical utility. (3) The finely divided suspended coal particles in black water represent a loss of valuable coal. Although the quantity of solids in black water is relatively small of the order of 1–10%, in view of the large quantities of black water (a typical plant produces about 7000 tons per day of black water), the total coal in the black water represents a substantial loss. Consequently it is desirable to recover this valuable coal from the waste product.

The art long struggled with the problem of black water clarification and resorted to inefficient makeshift practices. In some instances where permitted the black water was discharged into streams. Others reused the black water in their coal preparation operation but paid the penalty of inefficient operation with poor coal product. Other workers in the field removed the coal from water by froth flotation but found that the resultant froth was a stable mixture which, when attempts were made to filter it, blinded the filter cloth and had such a low rate of filtration as to make the operation economically impractical. Thus, the importance of efficiently producing a clarified water containing less than 0.1% solids from black water will be evident.

One object of the present invention is to provide an efficient and economical method of clarifying black water to reduce the solids content to less than 0.1%.

Another object is to provide a method of recovering coal from black water.

A further object of the invention is to provide a method of recovering coal from black water, which recovered coal has a lower ash content than the solids suspended in the black water.

A still further object is to provide a method of clarifying black water and separating refuse from the coal contained in the black water. Other objects and advantages will be apparent from the following description and accompanying drawing.

In accordance with the present invention, black water from coal preparation containing suspended solids in an amount of about 1–10% by weight of the black water composed of extremely fine coal and refuse particles such as clay particles with the majority of the particles below 44 microns in size is treated to produce a clarified water containing less than 0.1% by weight solids, a purified coal and a separate body of refuse by adding frothing agent to the black water, introducing air into a body of the black water containing frothing agent to form air bubbles which rise to the top of the body and carry with them finely divided solid particles composed of a major amount of coal particles and a minor amount of refuse particles in the form of a froth at the top of the body, removing the froth from the top of the body, discharging tailings which are predominantly refuse contained in the black water from the body, and passing said tailings together with water from the body to a thickener, directing the froth from the top of the body onto a vibrating screen having a mesh size small enough to prevent the coal particles from dropping therethrough but sufficiently large to permit passage therethrough of free water and finely divided clay particles, preferably said screen having a pitch of 10–40° and said screen having a mesh size between 80–120, discharging underflow from the vibrating screen i.e. the water and finely divided clay particles passing through the screen and if desired returning all or part of said underflow for admixture with incoming black water for froth flotation treatment or passing all or part of said underflow to a thickener, passing the broken, partially dewatered froth to a filter to separate the coal from the water, discharging the coal from the filter, discharging the filtrate and if desired passing said filtrate to a thickener, removing from the top of the thickener water having a solids content of less than 0.1%, withdrawing a slurry of solids from the bottom of the thickener and passing said slurry to a second filter to separate the solids as refuse from the water in the slurry, discharging the refuse from the filter, discharging the filtrate from the second filter and if desired returning the filtrate to the thickener.

The accompanying drawing diagrammatically illustrates one method of carrying out the present invention. Referring to the drawing the charge material, black water, entering through line 1 is the final washery effluent, composed of extremely fine coal and refuse particles that are not settled by the usual centrifugals, wet cyclones and settling tanks used in coal preparation with the majority of particles minus 325 mesh in size. The solids content of the black water varies from about 1 to 10% by weight and due to the fineness of the particles is practically unfilterable. The black water enters conditioner 2 which is a large tank of sufficient capacity to retain the black water for several minutes during which time stirrer 3 powered by suitable motor not shown in the drawing agitates the contents and effects intimate mixing with frothing agents entering through line 4. The purpose of conditioner 2 is to assure that each particle of coal has come into contact with the reagent which is usually a small amount of an oil such as kerosene and the frothing material such as methyl isobutyl carbinol or other suitable reagents known in the art producing the same result.

The mixture of black water and the frothing agents overflows from the top of conditioner 2 through line 5 into the feed box of the froth cell designated generally by numeral 6. In the froth cell air is introduced into the bottom of the cell by means of an impeller, not shown in the drawing, and the air and black water is so mixed at the bottom of the cell that the oil coated carbonaceous material become attached to the small bubbles of air due to the oil-coated particles having an affinity for the air bubbles thus causing the small particles of coal to float to the surface while the shale and slate material remain at the bottom of the froth cell. The floating coal in the form of a froth which collects on top of the cell is removed by a rotating paddle over the discharge lip of the cell and discharges through line 7. The tailings which are the refuse from the coal being fed from the conditioner, are discharged from the opposite end of the cell than the feed and are approximately 50% to 70% ash, along with the majority of the water being fed to the cell through line 5. The tailings are discharged from froth cell 6 through line 8 and usually the tailings water is treated with a small amount of acid such as sulfuric acid to lower the pH to approximately 6.5 for the purpose of assisting flocculation of clay particles. If desired a suitable flocculation agent such as potato starch may be added to promote flocculation. The tailings are directed through line 8 to thickener 9 which may be any suitable vessel for effecting settling such as the Dorr settler. Froth cells of the type herein described are manufactured by several companies and in practice we have successfully used the "Wemco" froth cell sold by Western Machinery Company.

The froth discharging from froth cell 6 through line 7 is a quite stable, low density mixture of bubbles of air, finely divided particles of coal together with some clay particles and water, the solids content usually constituting less than 20%. One of the big problems of froth containing finely divided particles of coal of minus 325 mesh and having a solids content of less than 20% is to separate the coal from the large quantity of water in the form of air bubbles admixed with it. In attempts to filter the froth to separate the coal from the water it was found that the rate of filtration was so slow and the degree of water removal was so little that for all practical purposes filtration was a failure. To overcome this difficulty in accordance with the present invention the froth is discharged onto the top deck of a vibrating screen 11 equipped with a screen cloth of small enough mesh size to prevent the coal particles from dropping therethrough but sufficiently large to permit passage of free water and finely divided clay particles through the screen and vibrated at a frequency to break down the froth and at the same time remove excess water and clay. In practice it was found that a screen of about 80–120 mesh preferably 100 mesh stainless steel screen cloth operated at about 1000–2000 r.p.m. would satisfactorily accomplish the desired result. In operation a 4′ x 10′ single deck Model AVS Aero-Vibe screen having a 100 mesh screen surface, .0050″ openings, .0050″ diameter and equipped to operate at 15°, 1000 r.p.m., 1/32″ throw, manufactured by Allis-Chalmers Manufacturing Company was found to serve satisfactorily. The vibrating screen serves a threefold function, namely (1) breaking down the froth, (2) eliminating a substantial amount of water from the froth which passes down through the screen and (3) improving the purity of the coal content by some of the clay particles also passing down through the screen. The effect of subjecting the froth to the action of the vibrating screen may be illustrated as shown by actual operation by an increase of the specific gravity of 0.6 of the froth fed to the screen to a specific gravity of 0.9 of the material after screening, the separation and removal of over 40% of the water in the froth and purification of the coal to the extent of reducing the ash content of the coal approximately ½%.

Since the finely divided particles of coal and clay were −325 mesh it would normally be expected that such −325 particles would pass through an 80–120 mesh screen which has apertures larger than the particle size. What actually happens as confirmed by practical experience and commercial operation is that the coal particles selectively agglomerate to a size larger than the apertures in the screen and are retained on the screen while the clay particles pass through the screen. The separation of the very fine particles of clay from the agglomerated coal particles aids in preventing filter cloth blinding as now explained. A filter cloth works by the principle of larger particles bridging holes of cloth. Smaller particles are then retained by the larger particles. If much clay or other unagglomerated small particles are present, they will choke off the filter cloth before cake is built up to sufficient thickness to discharge, or will greatly cut down the filter production. Hence, the screen aids the filter by removing clay or any by chance unagglomerated coal particles.

The material from the top deck of vibrating screen 11 is fed through line 12 to coal filter 13 which may be any suitable conventional filter. In practice a 5 disk 8′ diameter coal filter was employed. The valuable purified coal separated by the filter is discharged through line 14 onto a suitable conveyor and may be mixed with coal from the coal preparation plant. The filtrate from coal filter 13 is pumped through line 15 to thickener 9. Water and finely divided clay particles passing down through vibrating screen 11 are directed through lines 16 and 17 to thickener 9. If desired a portion of the water may be recirculated through line 18 to conditioner 2. The slurry of refuse and water collecting in the bottom of thickener 9 is directed through line 19 to refuse filter 21 which may be any conventional suitable filter preferably a drum type filter. The refuse collecting on the filter having an ash content of as high as 70% or more is scraped off and discharged through line 22 from the system. The filtrate withdrawn from refuse filter 21 through line 23 has a low solids content, of the order of 0.01% or less, and may be sent directly to the water tables for the preparation of coal or if desired may be returned via line 24 to thickener 9. Clarified water removed from the top of thickener 9 through line 25 has a solids content of less than 0.1% and is eminently suitable for use in coal preparation.

The following example illustrates the present invention.

Black water containing 6% solids in which more than 80% of the particles were minus 325 mesh was treated as illustrated in the drawing by first conditioning it i. e. admixing it with kerosene and methyl isobutyl carbinol in a conditioner tank wherein the contents were violently agitated for three minutes by means of an impeller to effect intimate contact between the frothing agents and the coal particles. Aqueous liquor from the process containing 2.6% solids at the rate of 30 gallons per minute was also added to the black water and admixed in the conditioner. The mixture from the conditioner in an amount of 1030 gallons per minute and containing 5.9% solids was directed to the froth cell and froth in an amount of 275 gallons per minute containing 19.2% solids was removed from the top of the froth cell. Tailings and tailings water in an amount of 750 gallons per minute and containing 0.81% solids was discharged from the froth cell and directed to a thickener. The froth was then subjected to the action of a vibrating screen of 100 mesh size and operating at 1000 r.p.m. which caused breaking down of the froth with the separation of 126 gallons per minute water containing 0.96% solids. From the top of the screen the material at the rate of 149 gallons per minute and containing 33.3% solids was discharged and filtered in a 5 disk filter. The filter cake representing valuable coal was discharged from the filter and the filtrate in amount of 71 gallons per minute and containing 0.21% solids was sent to the thickener. 30 gallons per minute of the water separated by the vibrating screen was recirculated to the conditioner. The remainder or 96 gallons per minute was sent to the thickener. The total gallonage from the froth cell, vibrating screen and coal filter was 942 gallons per minute. Slurry from the bottom of the thickener at the rate of 43 gallons per minute was directed to drum refuse filter to separate the refuse from the water and the refuse discharged from the system. The filtrate containing practically 0% solids at the rate of 30 gallons per minute was discharged from the filter and could be used directly on the water tables for the preparation of coal or could be returned to the thickener. Clarified water containing 0.06% solids was withdrawn at the rate of 928 gallons per minute and returned for use in the coal preparation plant.

Although certain preferred embodiments of the invention have been disclosed for purpose of illustration, it will be evident that various changes and modifications may be made therein without departing from the scope and spirit of the invention.

I claim:

1. A process for the treatment of black water to produce therefrom a clarified water containing less than 0.1% by weight solids, a purified coal product and a separate body of refuse which comprises adding frothing agent to black water containing suspended solids in an amount of about 1–10% by weight of the black water composed of extremely fine coal and refuse particles with the majority of the particles below 44 microns in size, introducing air into a body of the black water containing frothing agent to form air bubbles which rise to the top of the body and carry with them finely divided solid particles composed of a major amount of coal particles and a minor amount of refuse particles in the form of a froth at the top of the body, removing the froth from the top of the body, discharging tailings which are predominantly refuse contained in the black water from the body, passing said tailings to a thickener, directing the froth from the top of the body onto a vibrating screen having a mesh size small enough to prevent the coal particles from dropping therethrough but sufficiently large to permit passage therethrough of separated water and finely divided refuse particles, discharging underflow composed of water and finely divided clay particles passing through the vibrating screen, passing at least a part of said underflow to the thickener, passing the broken, partially dewatered froth from the vibrating screen to a filter to separate the coal from the water, discharging the coal from the filter, discharging the filtrate from the filter, withdrawing a slurry of solids from the bottom of the thickener, passing said slurry to a second filter to separate the solids as refuse from the filter, discharging the filtrate from the second filter, and removing from the top of the thickener clarified water having a solids content of less than 0.1%.

2. A process as claimed in claim 1 wherein said vibrating screen has a pitch of 10–40° and has a mesh size between 80–120.

3. A process for the treatment of black water to produce therefrom a clarified water containing less than 0.1% by weight solids, a purified coal product and a separate body of refuse which comprises adding frothing agent to black water containing suspended solids in an amount of about 1–10% by weight of the black water composed of extremely fine coal and refuse particles with the majority of the particles below 44 microns in size, introducing air into a body of the black water containing frothing agent to form air bubbles which rise to the top of the body and carry with them finely divided solid particles composed of a major amount of coal particles and a minor amount of refuse particles in the form of a froth at the top of the body, removing the froth from the top of the body, discharging tailings which are predominantly refuse contained in the black water from the body, adding acid to said tailings to lower the pH to approximately 6.5, passing said tailings to a thickener, directing the froth from the top of the body onto a vibrating screen having a mesh size small enough to prevent the coal particles from dropping therethrough but sufficiently large to permit passage therethrough of separated water and finely divided refuse particles, discharging underflow composed of water and finely divided clay particles passing through the vibrating screen, returning part of said underflow for admixture with incoming black water for froth flotation treatment, passing part of said underflow to the thickener, passing the broken, partially dewatered froth from the vibrating screen to a filter to separate the coal from the water, discharging the coal from the filter, discharging the filtrate from the filter, passing said filtrate to the thickener, withdrawing a slurry of solids from the bottom of the thickener, passing said slurry to a second filter to separate the solids as refuse from the water in the slurry, discharging the refuse from the filter, discharging the filtrate from the second filter, passing said filtrate to the thickener, and removing from the top of the thickener clarified water having a solids content of less than 0.1%.

References Cited in the file of this patent

UNITED STATES PATENTS

| | | |
|---|---|---|
| 1,667,277 | Wilkinson | Apr. 24, 1928 |
| 2,175,178 | Campbell | Oct. 10, 1939 |
| 2,754,006 | Harris | July 10, 1956 |

OTHER REFERENCES

"Coal Age," November 1953, pages 94–95.

"Handbook of Mineral Dressing," Taggart, John Wiley and Sons, Incorporated, New York, Section 12, page 25.